Patented May 4, 1937

2,079,336

UNITED STATES PATENT OFFICE 2,079,336

SHORTENING COMPOUND AND PROCESSES OF PREPARING THE SAME

Anderson W. Ralston and Victor Conquest, Chicago, Ill., assignors to Armour and Company, Chicago, Ill., a corporation of Illinois No Drawing. Application March 1, 1935, Serial No. 8,958

12 Claims. (Cl. 99—163)

This invention relates to shortening compounds and it comprises a shortening compound containing normally solid glycerides in quantities sufficient to develop "graininess" in the shortening, and containing small quantities of ammonium soaps to inhibit such grain formation; and it further comprises processes of preventing loss of plasticity and preventing brittleness from developing in such compounds.

Shortening compounds are customarily incorporated in various types of batters such as cake batters. These compounds are mostly vegetable and animal oils and fats, and edible hydrogenated oils. Mixtures of fats and oils are currently manufactured and sold. Some of them are liquid, others are solid or semi-solid masses such as lard and hydrogenated cottonseed oil. Many of the shortening compounds manufactured commercially contain stearine, a solid glyceride. Cottonseed oil, for instance, contains stearine, olein, linolein, and palmitin. The solidification point of stearine is about 70° C. but, in cottonseed oil, the quantity of stearine is relatively small so that no grains or crystals of stearine tend to form. This oil is normally liquid at room temperature. Many other shortening fats such as beef tallow also contain palmitin, olein and stearine but the quantity of stearine is much greater so that such fats are normally solids. The melting point of beef tallow for instance is from 42° C. to 46° C. and the quantity of stearine, expressed as stearic acid, is over 50 per cent.

Because of the tendency for grain formation, or "graininess" to develop, it has hitherto been considered necessary to keep the quantity of stearine in shortening compounds below that at which grains of stearine begin to separate out. This is somewhat like the crystallization of inorganic salts from saturated solutions thereof. Solid and semi-solid shortening materials should have a smooth texture, much like petroleum jelly and they should be free of grains or solid crystals of stearine. Although all of these compounds can be melted to give substantially homogeneous liquefied products, they are not usually melted when portions are taken for incorporation in batters. In commercial bakeries the baker simply dips his hand into a can of the shortening for scooping out the desired quantity and any grains or solid particles of stearine are noticed immediately. Moreover, since the shortening is generally incorporated in cold batters, these particles of stearine are definitely objectionable because they become scattered through the batter in a heterogeneous sort of way.

Beef tallow, and other solid fats containing relatively large amounts of stearine, cannot be added in any great amount to cottonseed oil or other edible oils when making up shortening compounds because of this tendency for stearine to crystallize out or develop grain formation in the compound. Nevertheless beef tallow is a desirable constituent in shortenings and greater quantities of it, and other "high stearine" fats, would be admixed with edible oils were it not for this disadvantage.

We have now discovered that we can prevent grain development in shortenings containing stearine in amounts ordinarily leading to graininess provided we incorporate in the shortening an ammonium soap. Apparently the soap acts as a "crystallization inhibitor" and surprisingly small amounts of the soap are enough.

Thus we make up a mixed shortening containing 65 parts by weight of cottonseed oil and 35 parts by weight of beef tallow. This gives us a semi-solid, plastic mass having a consistency much like ordinary lard. To it we then add as little as 1 part by weight of ammonium oleate to prevent crystallization or graining of the stearine. Advantageously all ingredients are mildly heated to just above the melting point of the tallow so that when the mass cools down and assumes a semi-solid state all ingredients are well incorporated therein. In the absence of the ammonium oleate a portion of the stearine would, within a few hours, begin to crystallize out and the product would develop graininess.

Instead of using ammonium oleate we can use any ammonium soap such as ammonium laurate, palmitate, stearate and linoleate. The quantity of soap can vary over wide limits, from about 0.25 to as high as 10 percent but we find no advantage in using amounts of soap much in excess of 1 per cent of the total mixture. We do not, however, wish to be limited to any specific proportions.

Various mixtures of shortening fats and oils can be used. Thus we can make up mixtures of beef tallow with cottonseed oil, sesame oil, sunflower oil, soya bean oil and any of the other vegetable and animal edible shortening oils. Likewise we can use high-stearine-containing fats other than beef tallow. We can use mutton tallow and any fat usually solid at room temperature and consisting largely of stearine. Hence our invention in its broadest aspects in part comprises a shortening mixture containing stearine in quantities ordinarily tending to crystallize together with an ammonium soap or mixtures thereof to inhibit such crystallization.

Our invention is also applicable to improving hydrogenated edible oils. When cottonseed oil, for example, is hydrogenated, great care must be taken to prevent the formation of iso-olein. Iso-olein is largely responsible for lack of plasticity and for imparting brittleness to all-hydrogenated shortenings. In other words, if the hydrogenation of the oil is not carefully controlled as to temperature and other factors, quantities of iso-olein tend to form. This is something which the art has recognized and much care is exercised to prevent it: The iso-olein is solid at room temperature and of course, if there be enough of it present in the hydrogenated oil it will crystallize out in time and develop graininess in the product.

We find that we can prevent graininess from developing in such hydrogenated products containing crystallizable quantities of iso-olein provided we add from 0.25 to 5 or 10 per cent of an ammonium soap thereto. In this case the soap inhibits crystallization of the iso-olein in the same fashion as in the case of stearine described above. This means that we can hydrogenate the oil without going to great expense to control the selectivity of the hydrogenation so that but small amounts of iso-olein are formed. We can let quantities of iso-olein form and then inhibit the development of brittleness or loss of plasticity by incorporating ammonium soaps or mixtures thereof in the hydrogenated product before much brittleness has time to develop.

This use of our invention is in effect a modification of that previously described in connection with the inhibiting of stearine crystallization.

While we have more specifically referred to incorporating ammonium soaps in shortening agents by adding the soap thereto, we can incorporate the soap in situ. We can for example start with a shortening mixture to which has been added, or contains a small amount, of the order of 1 percent of a free fatty acid, such as oleic, lauric, palmitic or stearic and then treat the shortening mixture while at a moderately elevated temperature, just enough to liquefy it, with gaseous anhydrous ammonia, in this way "neutralizing" the acid in situ with ammonia and forming the ammonium soap in the body of the shortening.

All of the products of the present invention are anhydrous or substantially so, since the shortening oils or fats contain but little moisture, almost always less than about 0.2 per cent, and generally less than 0.1 per cent. Hence we distinguish from aqueous emulsions which may use soaps as emulsifying agents.

Having thus described our invention what we claim is:

1. A substantially anhydrous shortening compound containing a solid glyceride in quantities normally tending to develop grain formation therein and a small amount of an ammonium soap to inhibit such grain formation.

2. The compound as in claim 1 wherein the soap is ammonium oleate.

3. A substantially anhydrous shortening compound containing stearine in quantities normally tending to develop grain formation therein and a small amount of an ammonium soap to inhibit such grain formation.

4. The compound as in claim 3 wherein the soap is ammonium oleate.

5. A substantially anhydrous hydrogenated shortening containing iso-olein in quantities normally tending to develop brittleness and loss of plasticity, and a small amount of an ammonium soap to inhibit such brittleness and loss of plasticity.

6. The compound as in claim 5 wherein the soap is ammonium oleate.

7. A substantially anhydrous shortening containing an edible oil, stearine, and a small amount of an ammonium soap, the quantity of stearine in the compound being such that in the absence of the soap it would tend to develop grain formation.

8. A substantially anhydrous shortening compound as in claim 7 wherein the edible oil is cottonseed.

9. A substantially anhydrous shortening compound comprising cottonseed oil, beef tallow, and an ammonium soap, the amount of stearine in the compound being such that in the absence of the soap it would tend to develop grain formation.

10. The method of inhibiting grain formation in substantially anhydrous shortening materials containing solid glycerides in quantities normally tending to develop grains which comprises incorporating an ammonium soap in the shortening material to inhibit grain development.

11. The method of inhibiting grain formation in substantially anhydrous shortening materials containing stearine in quantities normally tending to develop grains which comprises incorporating an ammonium soap in the shortening material to inhibit grain development.

12. The method of preventing loss of plasticity and development of brittleness in substantially anhydrous hydrogenated oils containing iso-olein in quantities normally tending to develop brittleness and loss of plasticity which comprises incorporating an ammonium soap in said hydrogenated oil.

ANDERSON W. RALSTON.
VICTOR CONQUEST.